United States Patent
Nichols et al.

(10) Patent No.: US 7,512,462 B2
(45) Date of Patent: Mar. 31, 2009

(54) AUTOMATIC CONTINGENCY GENERATOR

(75) Inventors: William Mark Nichols, San Diego, CA (US); Jack Houchard, Bellbrook, OH (US)

(73) Assignee: Northrop Grumman Corporation, Los Angeles, CA (US)

( * ) Notice: Subject to any disclaimer, the term of this patent is extended or adjusted under 35 U.S.C. 154(b) by 191 days.

(21) Appl. No.: 10/989,777

(22) Filed: Nov. 16, 2004

(65) Prior Publication Data

US 2006/0106506 A1    May 18, 2006

(51) Int. Cl.
*G06F 21/00* (2006.01)
(52) U.S. Cl. .......................................... 701/3; 340/945
(58) Field of Classification Search ............... 701/3, 701/14, 29, 31, 35; 340/945, 963; 244/194, 244/164, 183, 184
See application file for complete search history.

(56) References Cited

U.S. PATENT DOCUMENTS

| | | | |
|---|---|---|---|
| 4,500,966 A * | 2/1985 | Zagranski et al. ........... 701/116 |
| 4,536,843 A | 8/1985 | Lambregts |
| 5,564,650 A | 10/1996 | Tucker et al. |
| 5,625,751 A * | 4/1997 | Brandwajn et al. ............ 706/20 |
| 5,716,032 A | 2/1998 | McIngvale |
| 5,842,142 A * | 11/1998 | Murray et al. ................ 701/16 |
| 6,122,572 A * | 9/2000 | Yavnai ........................ 701/23 |
| 6,266,610 B1 | 7/2001 | Schultz et al. |
| 6,269,301 B1 | 7/2001 | Deker |
| 6,377,875 B1 * | 4/2002 | Schwaerzler ................... 701/2 |
| 6,574,537 B2 | 6/2003 | Kipersztok et al. |
| 6,751,536 B1 * | 6/2004 | Kipersztok et al. ............ 701/29 |
| 6,985,810 B2 * | 1/2006 | Moitra et al. ............... 701/202 |
| 7,031,812 B1 * | 4/2006 | Pettigrew et al. ............. 701/14 |
| 7,158,877 B2 * | 1/2007 | Carlsson et al. ............. 701/206 |
| 2002/0035413 A1 | 3/2002 | Gardner |

FOREIGN PATENT DOCUMENTS

EP          1462898 A2    9/2004

* cited by examiner

*Primary Examiner*—Dalena Tran
(74) *Attorney, Agent, or Firm*—Robert P. Lenart, Esq.; Pietragallo Gordon Alfano Bosick & Raspanti, LLP (57) ABSTRACT

An autonomous air vehicle comprises a flight control system and an automatic contingency generator for automatically determining a contingent air vehicle route for use by the flight control system in response to contingencies experienced by the air vehicle. A method of automatically determining the contingent air vehicle route is also provided.

12 Claims, 6 Drawing Sheets

AUTOMATIC CONTINGENCY GENERATOR

FIELD OF THE INVENTION

This invention relates to aircraft control systems, and more particularly to such control systems that provide for automatic control of an aircraft based on the occurrence of various in-flight contingencies.

BACKGROUND OF THE INVENTION

The failure of critical systems or components in aircraft requires quick corrective action. When manned or unmanned aircraft fly in FAA controlled airspace, every conceivable contingency must be calculated and validated prior to flight. FAA rules require a contingent route every few minutes into a flight. For long duration flights this requires a large number of routes.

For missions using unmanned air vehicles (UAVs), pilots must plot a specific route for the UAV to fly and build in precise responses that the aircraft must make in the event that a variety of contingencies occur. For example, if the UAV loses an engine along the route, flight control software must provide the UAV with a pre-planned means for returning to an airfield and landing safely. In addition, if the UAV faces a minor emergency or loss of communication, the mission plan must account for those events. Mission plans are built for a specific area, and once the aircraft is in the area, the pilots on the ground can make manual inputs as necessary without compromising the aircraft's ability to respond to contingencies. However, depending on the mission, the aircraft may need to deviate from a specific area and a specific route.

There is a need for a system and method that can automatically produce alternative flight paths to allow the aircraft to respond to various contingencies.

SUMMARY OF THE INVENTION

This invention provides an autonomous air vehicle including a flight control system and an automatic contingency generator for automatically determining a contingent air vehicle route for use by the flight control system in response to contingencies experienced by the air vehicle.

In another aspect, the invention provides a method of automatically determining a route for an unmanned air vehicle, the method comprising the steps of: (a) identifying a destination point; (b) constructing a first vector from a location of the aircraft to the destination point; (c) determining if the first vector passes through a no-fly zone; (d) if the first vector does not pass through a no-fly zone, using the first vector as a new route; and (e) if the first vector passes through a no-fly zone, constructing a second vector from the location of the aircraft to a tangent point on the no-fly zone, establishing a waypoint near the tangent point, constructing a third vector from a waypoint to the destination point, determining if the third vector passes through a no-fly zone, and repeating step (e) using additional vectors until a vector to the endpoint is constructed that does not pass through a no-fly zone.

In yet another aspect, the invention provides an apparatus comprising an air vehicle including a flight control system, a first automatic contingency generator for automatically determining a contingent air vehicle route for use by the flight control system in response to contingencies experienced by the air vehicle, and a communications device for communicating with a control station, wherein the control station includes a second automatic contingency generator for automatically determining a contingent air vehicle route for use by the flight control system in response to a loss of communication with the air vehicle.

DETAILED DESCRIPTION OF THE INVENTION

This invention provides an automatic system for producing contingent actions to counter critical flight failures. The system is referred to as an "Automatic Contingency Generator" or ACG. In response to certain events, the ACG produces contingent actions by management of the total energy of the air vehicle. The energy can be managed, given the current wind conditions, to land the air vehicle at a runway within a glide range. The ACG control is designed to take control during critical flight failures such as loss of an engine, degraded modes of operation, and/or loss of a communications link. The ACG is also designed to achieve safe landing in friendly territory to eliminate loss of the vehicle, reduce collateral damage, and provide for maximum destruction of a vehicle that must land in hostile territory to prevent the loss of technology to enemy forces. In addition, the ACG can automatically generate alternative flight routes in response to in-flight changes in mission objectives.

Figure 1:
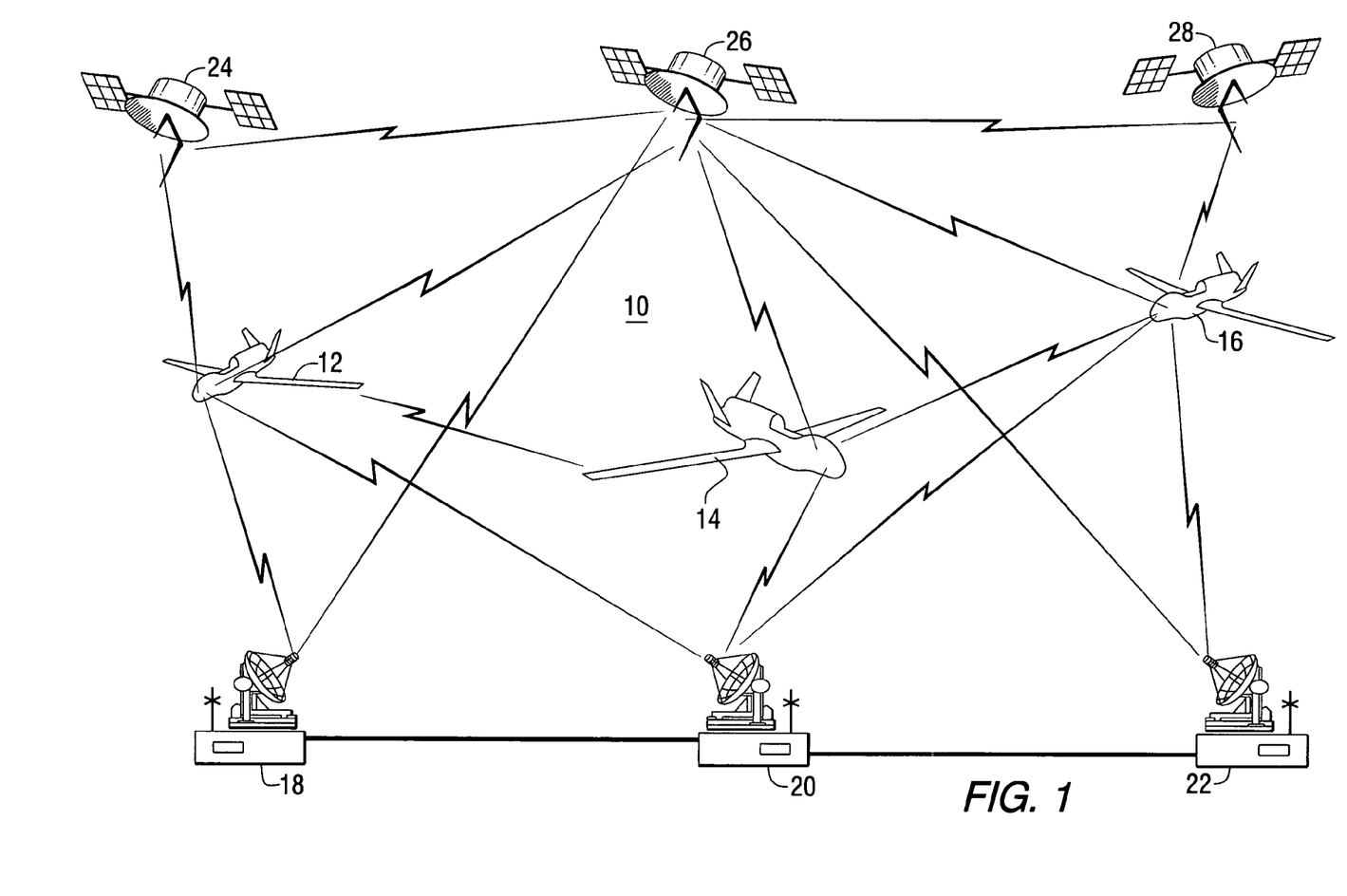
FIG. 1 is a schematic representation of a system that includes components constructed in accordance with this invention.

Referring to the drawings, FIG. 1 is a schematic representation of a system 10 including aircraft constructed in accordance with this invention. The system includes a plurality of unmanned air vehicles (UAVs) 12, 14 and 16. Each of the UAVs carries one or more sensors for supplying information about an area under surveillance. The UAVs can communicate with a plurality of ground stations 18, 20 and 22, and a plurality of satellites 24, 26 and 28. Communication links are provided among the various system components to achieve the desired functionality.

Each UAV includes a flight control and guidance system that is used to maneuver the UAV along a flight route. In the system of FIG. 1, each of the UAVs can communicate with one or more satellites. Pilots located at the ground stations can communicate with the UAVs.

Figure 2:
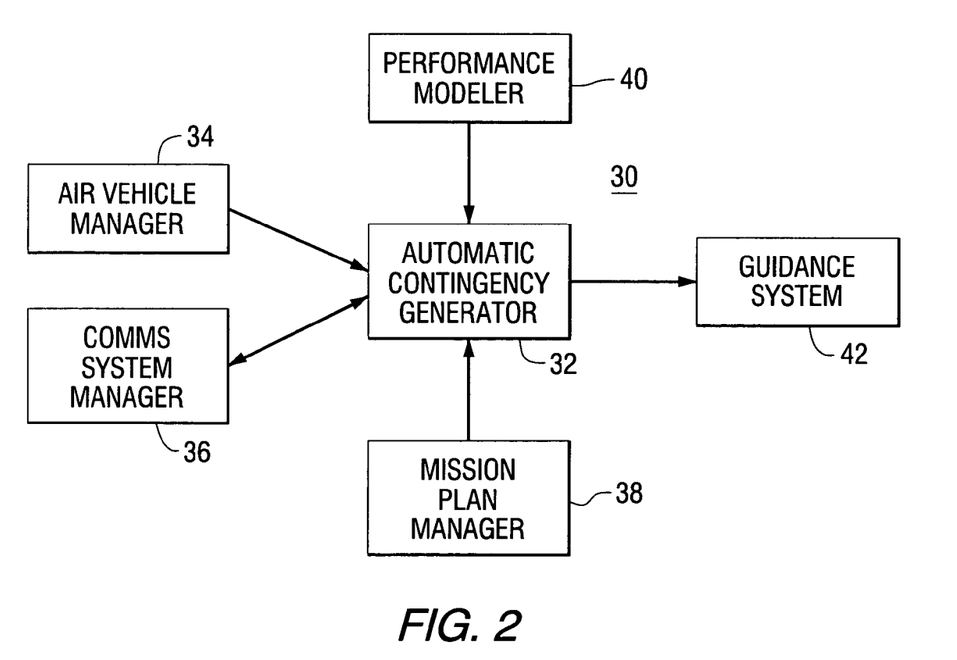
FIG. 2 is a functional block diagram of an aircraft control system that includes the automatic contingency generator of the present invention.

FIG. 2 is a functional block diagram of an aircraft control system 30 that includes an ACG 32. The control system includes a plurality of sensors that provide information to an air vehicle manager 34, which is responsible for assessing the mission criticality of subsystem faults and declaring contingency levels. A communications system manager 36 is responsible for controlling and monitoring the air vehicle communications assets, and may declare a lost communications contingency if all links are down. A mission plan manager 38 provides data access to mission data including restricted areas, special use airspaces, runways, approach patterns, aggregated terrain data, forecast winds, and alternate ground control stations for re-establishing communications. The automatic contingency generator is responsible for integrating the fault state from the air vehicle manager, communications state from the communications system manager, and mission data from the mission plan manager, to build flight routes to return to the main operating base or, potentially, one of many possible divert bases, and uses a performance modeler 40 to validate the route with respect to energy requirements, time, and fuel burned. The ACG interfaces with the vehicle guidance and flight control system 42 to control the operation of the air vehicle in event of a contingency. As the UAV flies the ACG generated route under lost communications conditions, the ACG continuously monitors air vehicle position relative to the alternate ground stations, and automatically reconfigures communications assets to maximize the likelihood of re-establishing communications.

Figure 3:
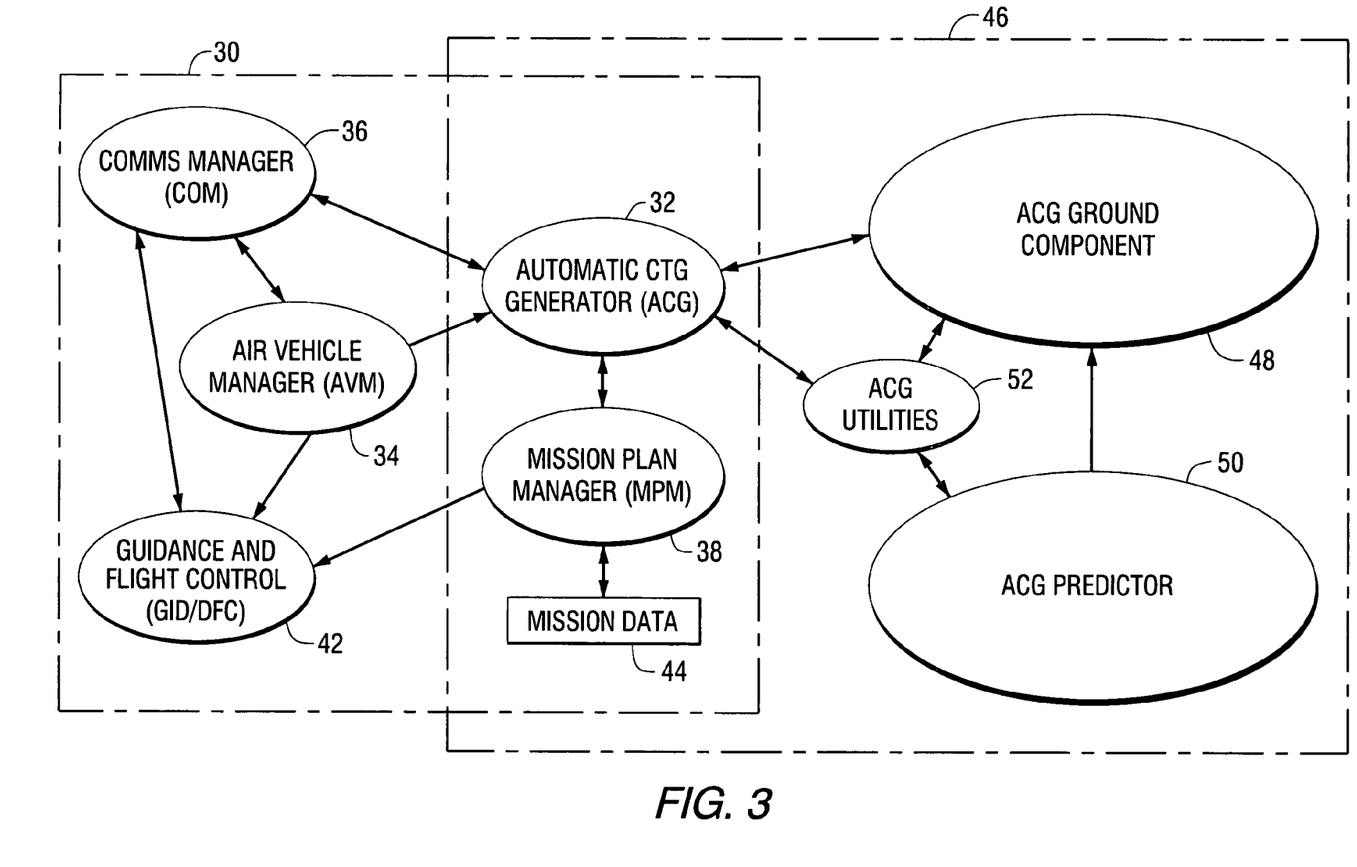
FIG. 3 is a diagram of selected components of an aircraft control system and ground station that includes the automatic contingency generator of the present invention.

The ACG and mission plan manager can be duplicated in a ground control station. FIG. 3 is a diagram of selected components of an aircraft and ground station that include the automatic contingency generator. As shown in FIG. 2, the aircraft control system 30 includes the air vehicle manager 34, the communications system manager 36, the mission plan manager 38, the automatic contingency generator 32, and the guidance and flight control 42. Mission data is loaded in the mission plan manager as shown by block 44. The automatic contingency generator 32 and the mission plan manager 38 can be duplicated in the ground station 46. The ground station also includes an ACG ground component 48, that reads and accepts mission data, computes range rings, builds routes and lists contingent destinations. An ACG predictor 50 monitors lost communication time, updates the air vehicle state from air traffic control data, gets estimates of air vehicle position, and gets the current route of the air vehicle. ACG ground utilities 52 are used to provide predictive capabilities if the air vehicle communications fail, and construct routes for what-if scenarios to speed up system performance and enhance pilot situation awareness in the ground station.

As shown in FIG. 3, the ACG software can exist both on the UAV and in a mission control station that normally maintains communication with the UAV from the ground. When a pilot tells the UAV to go to a different location, both the airborne ACG and the ground element generate new routes. Consequently, if the UAV loses communications with the mission control while it is traveling on an alternate route, the pilot will be able to predict what the UAV will do next.

In the preferred embodiment, the system is used in an autonomous, unmanned air vehicle (UAV). The UAV is capable of autonomously performing a predefined mission without additional inputs. For example, the UAV can autonomously take off, fly to a designated area, perform reconnaissance operations, return, and land. During the course of a mission, the UAV can fly over a large area, that includes numerous airbases, which can serve as potential landing sites, and areas of restricted air space, referred to as no-fly zones (NFZs). The UAV may also communicate with a pilot, who can be in a ground control station. The pilot can make changes to the mission during flight of the UAV. These changes may require route changes that can be automatically generated by the ACG. Various unplanned events can also occur during a mission that can affect the mission.

Figure 4:
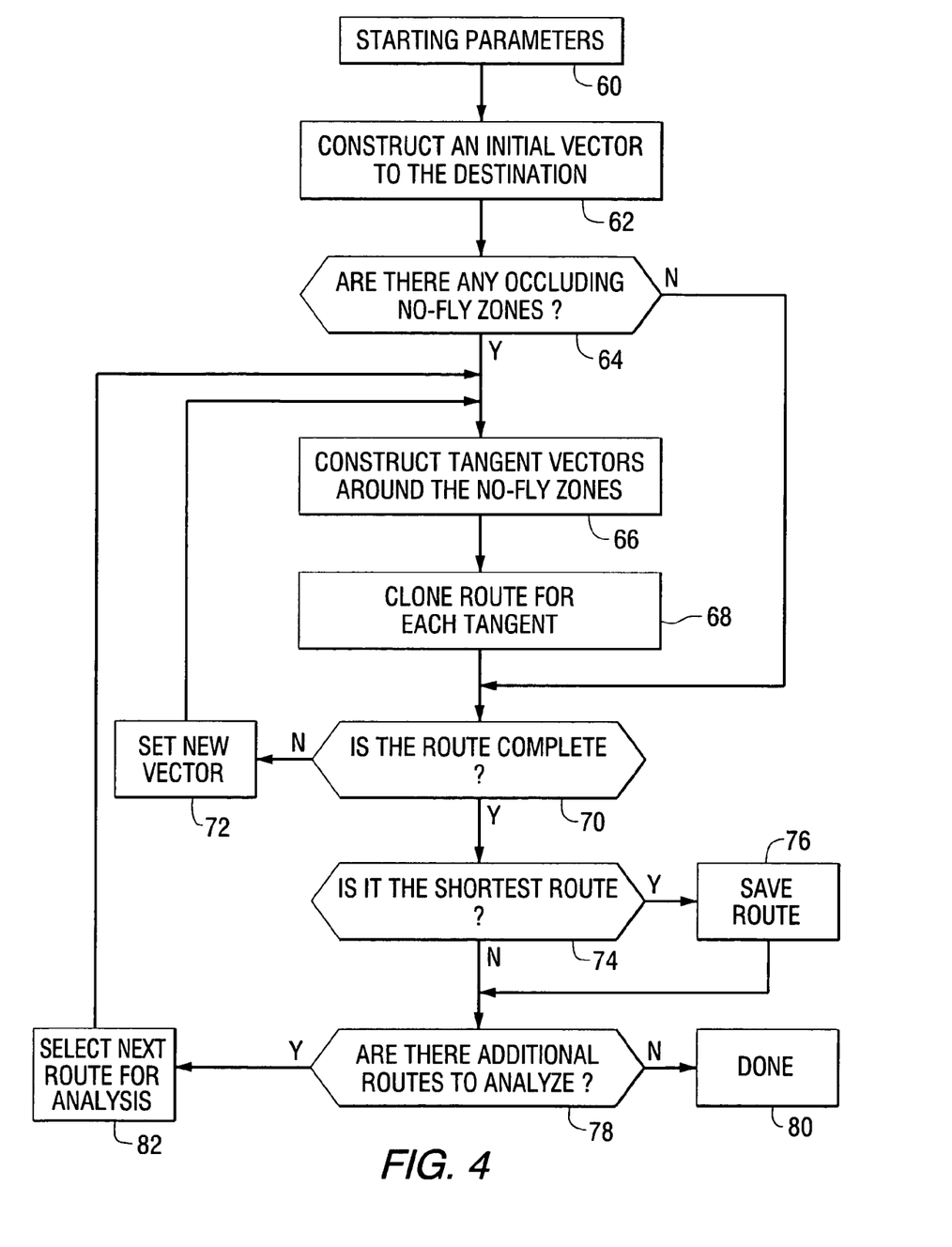
FIG. 4 is a flow diagram that illustrates a method for generating alternative routes.

FIG. 4 is a flow diagram of the process used by the ACG to construct a new route. The process starts in block 60 by identifying the initial conditions that must be considered to generate a new route. These initial conditions include but are not limited to the starting position, the starting heading, the location of the destination, current and forecast winds, current energy state, and definitions of no-fly zones. Given these initial conditions, the ACG constructs an initial vector from the UAV position to the destination, as shown in block 62. Block 64 shows that the ACG then determines if there are any occluding no-fly zones between the UAV position and the destination. That is, does the initial vector pass through any no-fly zones? If occluding no-fly zones are present, the ACG constructs a vector from the UAV position to tangent points on the occluding no-fly zone as shown in block 66. Then a route to the destination is cloned for each tangent vector (block 68). A cloned route contains a copy of the base route, all route construction context data, and the new vector to be considered as a candidate next-step on the route. In constructing the tangent vectors, the ACG takes into account, the air vehicle performance parameters, climatologic data or forecast weather, and temporal constraints.

Next the ACG checks to determine if it has established a complete route to the destination, as shown in block 70. If the route is not complete, the ACG sets a new vector as shown in block 72 and repeats the steps in blocks 66 and 68. If the route is complete, the ACG checks to determine if the route is the shortest route, as shown in block 74. If it is the shortest route, it is saved (block 76). Then the ACG checks to determine if there are additional routes to analyze, as shown in block 78. If not, the process ends (block 80). If so, the next route is selected for analysis as shown in block 82.

Figure 5:
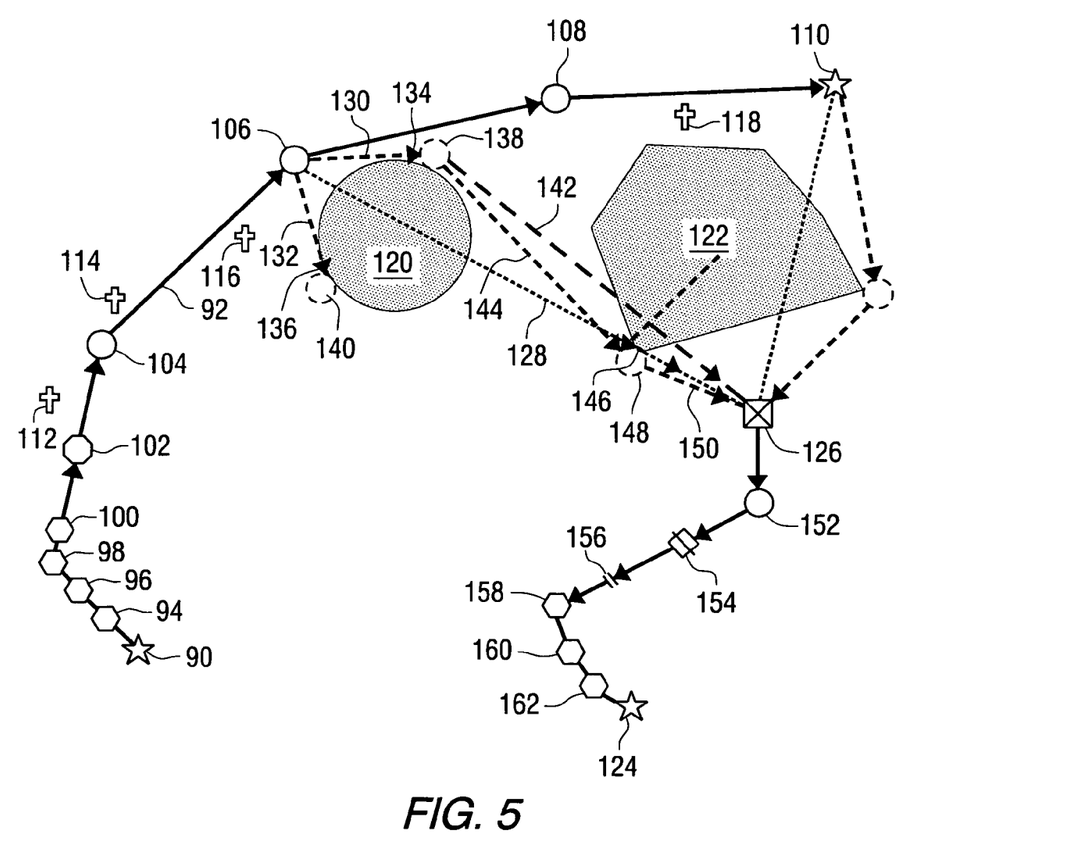
FIGS. 5 and 6 are schematic diagrams that illustrate the determination of alternative routes.

FIG. 5 is a diagram that further illustrates the elements and concepts involved in the route generation process. In the example illustrated in FIG. 5, the mission starts with the UAV at position 90. The UAV is programmed to follow an initial route illustrated by solid line 92. The initial route includes taxi positions 94, 96, 98 and 100 and a takeoff point 102. Predetermined waypoints 104, 106, and 108 are located between the takeoff point and a destination 110. Extirpation points 112, 114, 116 and 118 have been selected along the initial route. The initial route avoids no-fly zones 120 and 122. Assume that as the UAV reaches waypoint 106, a contingency occurs that requires the UAV to fly to a new end point 124. To reach the new end point, the UAV must construct a route to fly from waypoint 106 to the initial approach fix (IAF) 126. To determine a new route, the ACG generates a vector 128 from waypoint 106 to the IAF. Since this vector passes through both no-fly zones, the UAV cannot follow this vector to the IAF. Thus the ACG must search for alternate routes. The search for alternate routes begins by generating vectors 130 and 132 to tangent points 134 and 136 on the first no-fly zone 120. Candidate waypoints 138 and 140 are established near the ends of these vectors. The actual position of the waypoints can be a predetermined distance beyond the tangent points that depends upon the flight characteristics of the UAV, such as the turn radius.

When analyzing the proposed route that starts along vector 130, the ACG generates a new vector 142 from waypoint 138 to the IAF. Since this new vector passes through no-fly zone 122, it cannot be used as a component of a new route. Therefore, the ACG generates a vector 144 from waypoint 138 to a tangent point 146 on no-fly zone 122 and establishes a new waypoint 148. Then a new vector 150 can be generated directly from waypoint 148 to the IAF. A similar process would be performed for potential routes that follow each of the initial vectors that were generated to tangent points on the no-fly zones. Then the shortest route would be selected as the route to be used to fly the UAV to the IAF. From the IAF, the UAV would then proceed to waypoint 152, final approach fix (FAF) 154, touchdown point 156, and taxi points 158, 160 and 162 to reach the new end point.

When approaching an airbase, the UAV will implement FAA standard hold entry patterns for terminal geometry at all destinations, whether or not a hold pattern will be executed.

Figure 6:
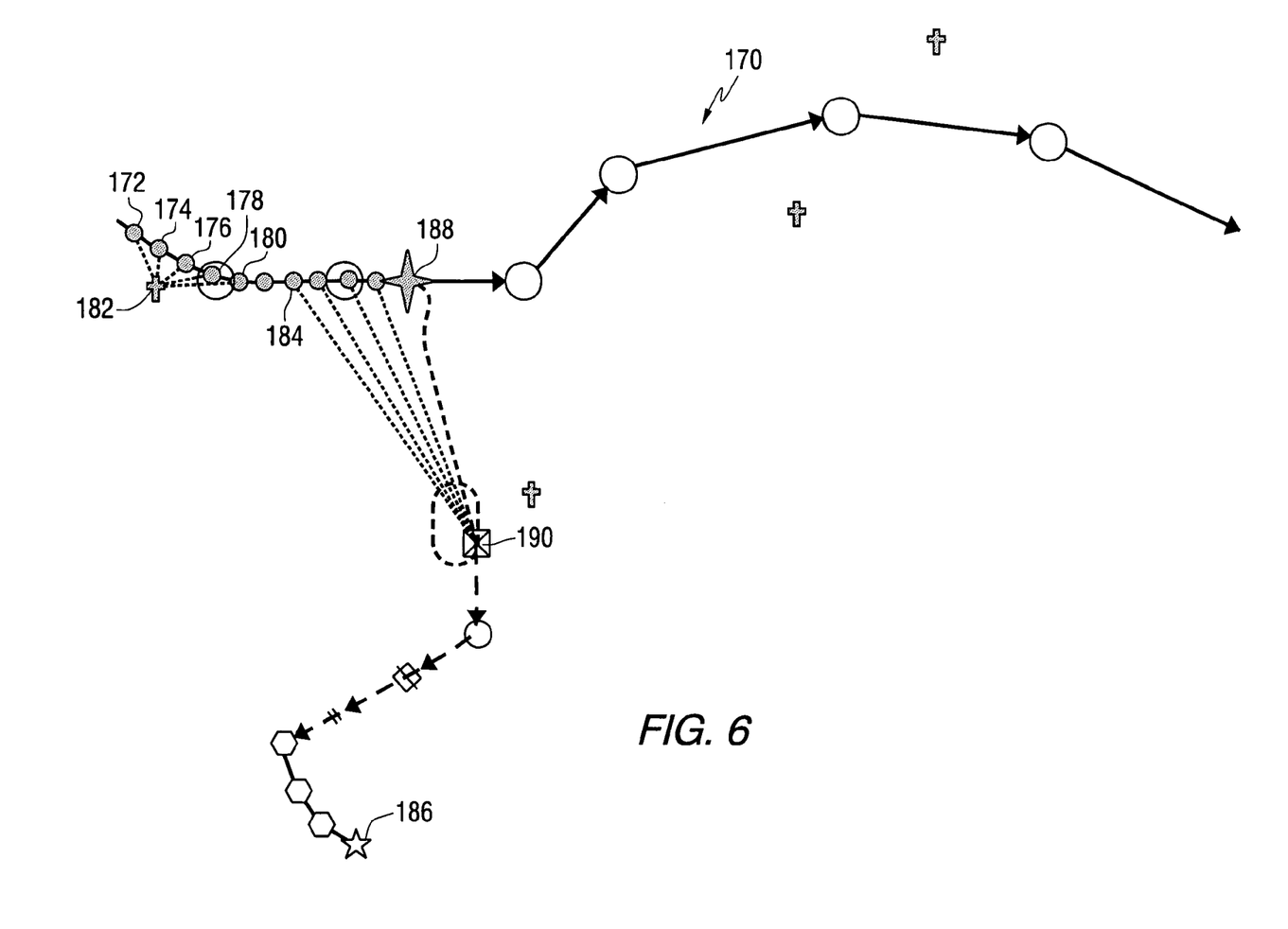

FIG. 6 is a diagram that illustrates the temporal sequence of steps taken by the ACG. In the example of FIG. 6, as the UAV travels along a route 170, the ACG continually determines new routes to alternative destination points. At points 172, 174, 176, 178 and 180, extirpation point 182 is selected as a destination to be used upon the occurrence of a critical emergency. Routes to extirpation point 182 are determined as the UAV flies along route 170. When the UAV reaches point 184, the ACG determines a new potential destination point 186. Again routes to the new potential destination point are determined as the UAV files along route 170. If an emergency contingency event occurs when the UAV is at position 178, the UAV will be directed to fly to the IAF 190, using the most recently determined route to destination 186.

In the preferred embodiment, the ACG addresses three types of contingencies: lost communications contingencies, flight critical (system degradation) contingencies, and mission critical emergency contingencies. The lost communications contingency is declared when all communications are lost with all ground stations. In this contingency, the air vehicle cannot operate under positive control, reducing the number of airbases enabled for operations. The ACG constructs a route following preplanned directions to one of many possible destinations designated for lost communications recovery. During flight on the ACG generated route, the ACG identifies alternative ground stations or satellites which may be used to re-establish communications, and automatically re-configures the communications system based on data included in the mission plan.

Time critical emergencies, including engine out and power system failure scenarios, are assessed continuously by ACG. The ACG uses the energy state of the air vehicle including: altitude relative to the ground, battery state, fuel state, the status of flight critical sensors and redundant control effectors (ailerons, elevators, rudder, landing gear, and engine). Energy state is used to determine the fly-out range of the air vehicle, and is used to identify candidate landing locations within range of the vehicle's current position. If the vehicle has insufficient energy to achieve any landing location, extirpation points may be preplanned into the mission data to provide a site where the vehicle may be safely destroyed, if operating in populated areas or in hostile airspace.

Mission critical emergencies, such as the loss of one or more redundant actuators, or the loss of a crucial payload element, generally require the air vehicle to return to the main operating base or an alternative base. The ACG follows preplanned directions, which may include skipping loops on the current route or reversing on the current route, to shorten the mission and arrive at the destination in minimal flight time.

The ACG also considers combinations of the three contingency types. For instance, an engine out scenario may also cause the loss of all communications. In this scenario, the list of candidate destinations for the time critical emergency is reduced to those that are also available for lost communications recovery.

Forecast wind data and actual winds are used to dynamically adapt all routes for wind effects on turn radius and vehicle climb/descent performance capabilities, and minimum fuel load required to execute the route. For example, 72 hour wind forecast data can be embedded in the mission plan, or may be uploaded to the aircraft during flight.

This invention provides a method for production of automatic flight paths to recover from critical flight failures or off nominal conditions for air vehicles both manned and unmanned. The method can be used to reduce collateral damage from unrecoverable flight failures. The angle of landing can be adjusted depending on whether extirpation point is in friendly or hostile territory. Kinetic and wind energy can be leveraged to glide to emergency landing areas automatically. Contingency calculations can be performed during flight.

The ACG removes the need to calculate the thousands of routes prior to flight and produces them only as needed or requested during flight. This reduces the planning required to fly an autonomous air vehicle in FAA controlled airspace due to removal of the requirement to calculate and validate every conceivable contingency prior to flight. If a pilot tells the UAV to go to a new destination, the ACG will build a new route, taking into account restricted airspace and other variables, and it prepares for what it will do and where it will land in the event it faces a major or minor contingency. Using the ACG, the pilot's planning time can be significantly reduced. The ACG lets the UAV respond to changes in its orders in mid-flight, devising a plan for what it will do in the case of a major or minor contingency.

While the examples shown in FIGS. 5 and 6 show two-dimensional route generation in longitude/latitude, the ACG actually performs the process in four dimensions, Longitude, Latitude, Altitude and Time. The ACG includes an elevation path generator that is used to generate the altitude profile based on air vehicle state, engine state, and obstacle clearance minimum altitudes based on standard Emergency Safe Altitudes (ESA) and Minimum Sector Altitudes (MSA) data available for most airbases, or may be set based on clearance altitudes available from air navigation charts. Adaptive elevation management adjusts the entire route, including the initial/final approach to compensate for forecast wind effects on air vehicle performance.

No-fly zones and approach routes are enabled and disabled as a function of time. For instance, a no-fly zone may be "hot" from 2:00 PM to 6:00 PM each day, or an airbase may be closed from 11:00 PM to 6:30 AM for noise abatement. As each route is built, expected arrival time is computed for each waypoint, no-fly zone, or approach route. Expected arrival times are compared to no-fly zone time spans (if defined), and the route generator must decide whether it is safe to fly through, or go-around the no-fly zone based on expected arrival. Approach routes with date/time restrictions are disallowed if the UAV cannot arrive at the approach within the available date/time restrictions.

Contingencies can be prioritized to make the destination selection and route generation. Under a normal approach, the UAV constructs a route to an approach pattern. Under a minimal approach, the UAV constructs a route (including approach) to a designated runway. Emergency runways can be used during climb/descent below 10K feet above ground level. Extirpation points are added to provide impact points where runways are unavailable and impact on route is unacceptable.

Potential destination points can be selected using criteria which include: destination availability, priority, sufficient energy to clear obstacles, sufficient battery time. If no destination is available within the battery time, impact along the current route can be implemented. At each in-flight waypoint on the primary route, the mission planner may specify: continue on route (forward), reverse on route with left (RL) or right (RR) turn, or branch to a destination.

In a ground station, the ACG predictor predicts the most probable UAV destination and routing during lost communications. The predictor uses air vehicle state information accrued to the point where communications are lost and predicts the air vehicles routing and ultimate destination. Provisions are made to allow predictor resets by inputting updated coordinates obtained via voice communications with air traffic controllers. During lost communications operation, the air vehicle automatically sets the IFF code to 7600. If the air vehicle has another in-flight emergency, transponder code is set to 7700, and provisions are made to allow an update to the air vehicle routing in the event of a time critical contingency as reflected by a change in air vehicle IFF squawk code.

While the present invention has been described in terms of several embodiments, it will be apparent to those skilled in the art that various changes can be made to the disclosed embodiments without departing from the scope of the invention as set forth in the following claims.

What is claimed is:

1. An apparatus comprising:
   an air vehicle including a flight control system, a first automatic contingency generator for automatically determining a contingent air vehicle route for use by the flight control system in response to contingencies experienced by the air vehicle, and a communications device for communicating with a control station; and
   wherein the control station includes a second automatic contingency generator for automatically predicting a contingent air vehicle route for the air vehicle in response to a loss of communication with the air vehicle, using vehicle state information accrued prior to the loss of communication.

2. The air vehicle of claim 1, wherein the first automatic contingency generator includes an elevation path generator to generate an altitude profile.

3. The apparatus of claim 1, further comprising:
   a performance modeler for providing the first automatic contingency generator with information relating to air vehicle performance.

4. The apparatus of claim 1, further comprising:
   a plurality of sensors;
   an air vehicle manager for assessing criticality of system faults and declaring contingency levels in response to inputs from the sensors;
   a communications system manager for controlling and monitoring communications assets of the air vehicle and declaring a lost communication contingency if all communication links are inoperative; and
   a mission plan manager for providing access to mission data including one or more of restricted areas, special use airspaces, runways, approach patterns, aggregated terrain data, forecast winds, and alternate ground control stations for re-establishing communications.

5. The apparatus of claim 4, wherein the sensors detect one or more of: redundant equipment failure, engine failure, and communications link failure.

6. The apparatus of claim 1, wherein the contingent route includes an angle of landing depending on whether an extirpation point is in friendly or hostile territory.

7. The apparatus of claim 1, wherein the first automatic contingency generator includes an elevation path generator to generate an altitude profile.

8. An air vehicle comprising:
   a flight control system; and
   an automatic contingency generator for automatically determining a contingent air vehicle route for use by the flight control system in response to contingencies experienced by the air vehicle, wherein the contingent air vehicle route includes an angle of landing depending on whether an extirpation point is in friendly or hostile territory.

9. The air vehicle of claim 8, further comprising:
   a performance modeler for providing the automatic contingency generator with information relating to air vehicle performance.

10. The air vehicle of claim 8, further comprising:
    a plurality of sensors;
    an air vehicle manager for assessing criticality of system faults and declaring contingency levels in response to inputs from the sensors;
    a communications system manager for controlling and monitoring communications assets of the air vehicle and declaring a lost communication contingency if all communication links are inoperative; and
    a mission plan manager for providing access to mission data including one or more of restricted areas, special use airspaces, runways, approach patterns, aggregated terrain data, forecast winds, and alternate ground control stations for re-establishing communications.

11. The air vehicle of claim 10, wherein the sensors detect one or more of: redundant equipment failure, engine failure, and communications link failure.

12. The air vehicle of claim 8, wherein the automatic contingency generator includes an elevation path generator to generate an altitude profile.

* * * * *